United States Patent [19]

Rich, Jr.

[11] Patent Number: 4,961,756
[45] Date of Patent: Oct. 9, 1990

[54] FLUIDIZED-BED COMBUSTION FUEL

[76] Inventor: John W. Rich, Jr., R.D. #1, Box 211, Auburn, Pa. 17922

[21] Appl. No.: 278,676

[22] Filed: Dec. 1, 1988

[51] Int. Cl.$^5$ .......................... C10L 5/00; C10L 11/00
[52] U.S. Cl. ........................................ 44/605; 44/503; 44/504; 44/620; 44/627
[58] Field of Search ................. 44/503, 504, 620, 627, 44/605

[56] References Cited

U.S. PATENT DOCUMENTS

| 1,659,692 | 2/1928 | Kitchen | 44/503 |
| 1,678,863 | 7/1928 | Kitchen | 44/504 |

FOREIGN PATENT DOCUMENTS

| 96695 | 6/1983 | Japan | 44/627 |

OTHER PUBLICATIONS

Briquetting, by Stillman, The Chemical Publishing Co., Easton, PA, 1923, p. 259.

*Primary Examiner*—Carl F. Dees
*Attorney, Agent, or Firm*—Howson & Howson

[57] ABSTRACT

A continuous fluidized-bed combustion process for particulate carbonaceous feedstock of high ash content. The feedstock fuel is prepared from culm or mine tailings washed in a dense media and crushed to yield a fuel product having an ash content in a range of about 30 percent to about 50 percent, by weight. The feedstock fuel is mixed with fine particles of scavenging material, such as limestone or dolomite, and the resulting feedstock mixture is burned in a circulating fluidized-bed combustion chamber. A portion of the ash remaining after combustion is discharged out the bottom chamber, the remainder being carried with the combustion gases through a hot cyclone and heat exchangers for generating power. The ash within these gases is separated and recirculated through the fluidized bed, and the combustion gases are discharged.

8 Claims, 1 Drawing Sheet

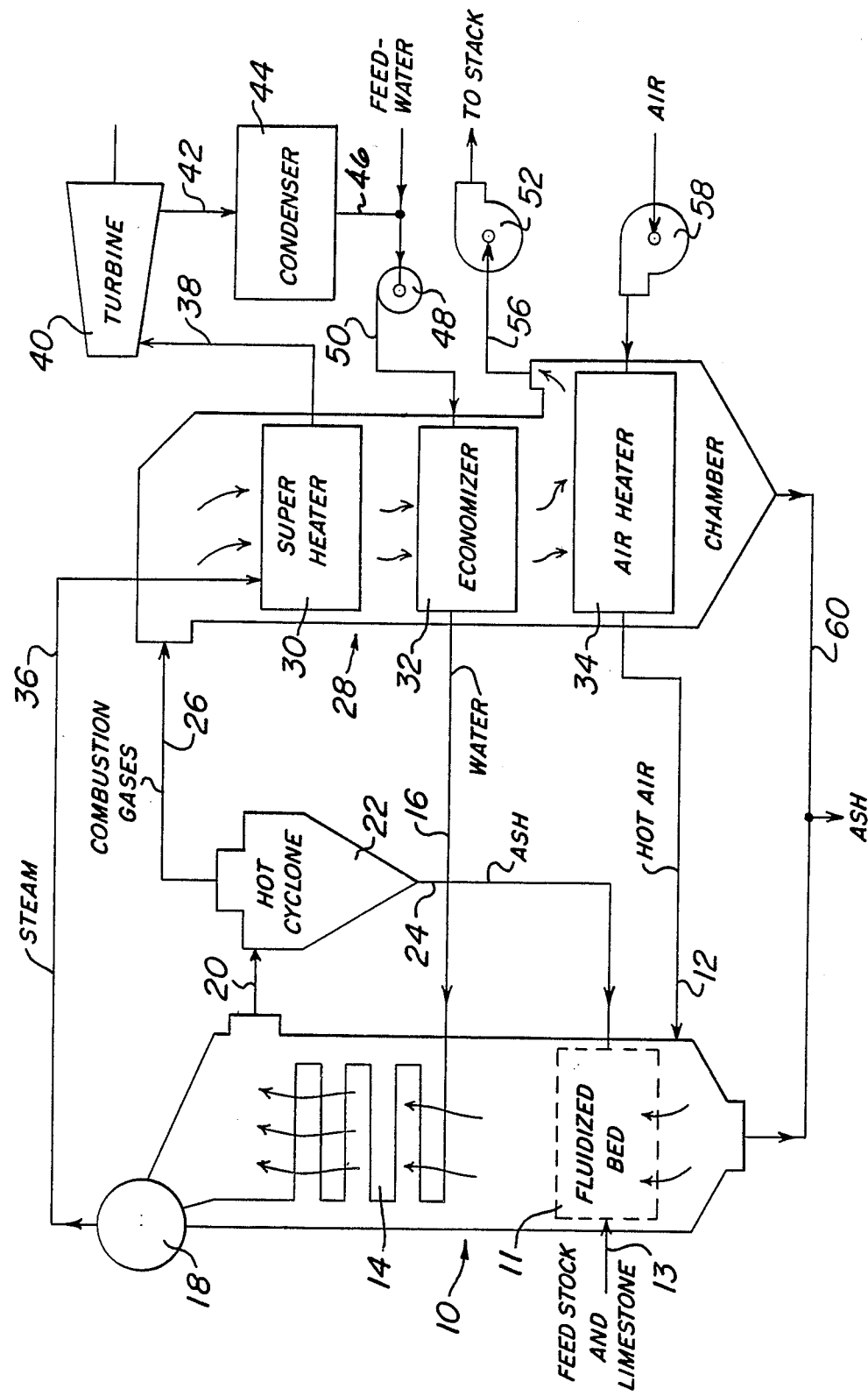

FLUIDIZED-BED COMBUSTION FUEL

BACKGROUND OF THE INVENTION

1. Field of the Invention

The present invention relates to fuel combustion in stationary power generating plants; and more particularly to particulate carbonaceous fuel and the use thereof in fluidized-bed combustion processes.

2. Description of the Prior Art

For many years, a goal of designers of combustion equipment has been to provide the capability of extracting a maximum amount of energy from a given fuel. To accommodate this goal, producers of fuel have strived to provide fuel having a relatively high heating value per unit of weight. With respect to particulate carbonaceous fuel, such as anthracite and bituminous coal, this has been generally accomplished by preparing the fuel in a manner as to contain a minimum amount of non-combustible material. In the art, this fuel is referred to as a low ash fuel because, when burned, the amount of ash in the resulting combustion product is a relatively low percentage of the weight of the fuel prior to combustion—generally about 10 percent, but less than about 20 percent, by weight.

Traditionally, low ash coal from a feedstock of mine tailings, or culm, has been prepared by any of several different processing techniques used alone or in combination with one another. For instance, carbonaceous material of relatively large particle size, such as 1 inch by 1/16 inch, may be fed into a cyclonic separator which separates it into a low ash product and a relatively high ash refuse. Such a separator is generally of a so-called tapered configuration and functions in cooperation with magnetite ore to effect separation at a desirable specific gravity and produce the desired product.

In U.S. Pat. No. 4,364,822 entitled "Autogenous Heavy Medium Process and Apparatus for Separating Coal from Refuse", issued to the present applicant, there is disclosed a process for producing a low-ash coal. In the process, the specific, gravity of the separating medium is regulated entirely by the amount of rock or shale contained within the mine tailings in combination with a cyclone of a particular configuration. This eliminates the need for magnetite ore and the cost associated therewith, and results in a product having a relatively low ash content.

Low ash coal is a suitable fuel for a variety of combustion processes, including fluidized-bed combustion processes. Such fluidized bed combustion processes, however, are also capable of burning relatively high ash coal. In a couple of installations of which Applicant is aware, the high ash coal is provided simply by crushing all of the material contained in a culm bank and feeding it directly into the fluidized-bed combustion equipment. The only pre-combustion fuel processing that takes place is that of removing oversize particles that might damage the crushing equipment. Such high ash fuel generally has an ash content of at least about 60 percent by weight. Such high ash coal is not particularly desirable as a fuel because it contains so much non-combustible material that the efficiency of the combustion process is relatively low.

There is often a tradeoff between the cost of producing a given fuel and the efficiency of its utilization. For instance, on the one hand while low ash fuel has a high heating value (BTU/lb.) and can be burned efficiently, it is relatively expensive to produce. On the other hand, while some high ash fuel can be less expensive to produce, its heating value is much lower so that its real cost, i.e. the cost of providing the equipment to burn it and of maintaining the equipment, is higher than desirable. Moreover, the total costs of producing crushed culm fuel can exceed that of producing washed culm fuel on a BTU per pound basis. A desirable fuel, therefore, is one which can be both produced in a cost efficient manner and burned efficiently.

In Applicant's copending U.S. application Ser. No. 860,464 filed May 7, 1986 entitled "Process for Separating High Ash Coal From Refuse", now U.S. Pat. No. 4,795,037, there is disclosed an improved process for producing a high ash carbonaceous fuel particularly suited for use in fluidized-bed combustion equipment. The process utilizes a separating cyclone such as disclosed in U.S. Pat. No. 4,364,822, supra, but in combination with magnetite ore to separate carbonaceous material having a high percentage of ash-forming impurities from non-combustible, ash-forming refuse. Prior to the process disclosed in Applicant's co-pending application Ser. No. 860,464, supra, there was no known cost efficient way of producing a high ash coal product capable of being burned efficiently in a fluidized-bed combustion process.

SUMMARY OF THE INVENTION

With the foregoing in mind, a primary object of the present invention is to provide a fluidized-bed combustion process which utilizes a novel fuel having a relatively high ash content which is basically carbonaceous in nature and essentially free from all non-combustible rock.

Another object of the invention is to provide an improved process for generating power by combustion of a novel high ash fuel in a fluidized-bed combustion system.

Still another object of the invention is to provide a novel high ash fuel suitable for efficient combustion in a circulating fluidized-bed, and which can be produced in a cost effective manner.

A further object of the invention is to provide a fuel and combustion process therefor which involve lower combustion chamber costs and lower boiler design risks, higher steam generator efficiencies, reduced plant emissions and water consumption, and less fuel storage and material handling requirements.

Briefly, these and other objects of the invention are accomplished with a continuous fluidized-bed combustion process using particulate carbonaceous feedstock fuel having an ash content in the range of about 30 percent to about 50 percent, and more preferably in a range of about 35 percent to about 45 percent, by weight, obtained from refuse such as culm, or mine tailings. The culm feedstock is prepared by dense media separation of high ash fuel from the refuse in which high ash fuel is mixed with fine particles of non-inert rock, such as limestone or dolomite, and burned in a circulating fluidized bed. A portion of the resulting ash is discharged out the bottom, the remainder being carried with the combustion gases through a tapered hot cyclone and a portion thereof recirculated through the fluidized bed. The combustion gases which exit the vortex of the hot cyclone travel to the baghouse and exit the stack.

BRIEF DESCRIPTION OF THE DRAWING

For a better understanding of these and other objects and aspects of the invention, reference is made to the following detailed description taken in conjunction with the accompanying drawing which is a schematic representation of a circulating fluidized-bed combustion process utilizing a high ash fuel according to the invention.

DESCRIPTION OF THE PREFERRED EMBODIMENT

Referring now to the drawing wherein like characters designate like or corresponding parts, there is shown a process for generating power with a high ash content washed culm fuel in a circulating fluidized-bed combustion system. A steam generating unit 10 includes a fluidized bed 11 of small particles of chemically reactive, i.e. non-inert, limestone or dolomite, heated to about 1600° F. to 1700° F., held in a dense suspension by a stream of hot air received from a duct 12. Particulate crushed carbonaceous fuel extracted from culm mine tailings and mixed with powdered limestone forms a feedstock fuel mixture which is continuously injected into bed 11 through a conduit 13 and burned. The limestone is continuously premixed with the feedstock fuel in an amount sufficient to replace any limestone which may have been depleted in the process by its reaction with other products of combustion. After initial screening to a size range of 4–6 inch×0, the smaller size fraction of feedstock fuel (¾inch×0) is preferably extracted from culm by a dense media separation process such as disclosed in Applicant's now-patented copending patent application Ser. No. 860,464, supra, the disclosure of which is incorporated by reference herein. Such process yields carbonaceous particulate matter having an ash content of at least about 30 percent, by weight. The larger size fraction of feedstock fuel (4–6 inch×¾ inch) is extracted by conventional drum separation or dense media baths to yield the same ash content.

The combustion gases from bed 11 pass through steam generating tubes 14 in unit 10 transforming preheated water received from a conduit 16 into steam which is collected in a steam drum 18. The combustion gases then continue through a conduit 20 to a hot cyclone 22 which centrifugally separates ash and limestone and recirculates them via a conduit 24 to bed 11. The combustion gases then pass through a conduit 26 to a chamber 28 which houses a superheater 30, an economizer 32 and an air heater 34. Superheater 30 receives the steam from drum 18 via a conduit 36 and produces steam conditions at a conduit 38 suitable for driving a turbine 40.

Turbine exhaust steam is transmitted via a conduit 42 to a condenser 44 where the steam is reduced to water, combined in a conduit 46 with makeup feedwater, and fed by a pump 48 via a conduit 50 to economizer 32. The water is heated in economizer 32 by the combustion gases from superheater 30 and returned via conduit 16 to steam tubes 14.

Heat from the combustion gases exiting economizer 32 is exchanged in air heater 34 to raise the temperature of the air provided by a blower 58 through duct 12 to beneath the fluidized bed 10. As the combustion gases exit the air heater 34, a baghouse (not shown) separates any remaining ash from the combustion gases which are exhausted through a duct 56 by a blower 52 to a stack, not shown. The ash flowing downward from fluidized bed 11 and the ash collected from chamber 28 are discharged via a conduit 60 in any convenient manner.

Feedstock fuel produced simply by crushing raw input from a typical N.E. Pennsylvania anthracite culm bank has an ash content of at least about 60 percent, by weight, based on the dry weight of a series of random samples from the bank crushed to ¼ inch×0 size. Feedstock fuel produced according to applicant's copending application, supra, has an ash content of at least about 30 percent, by weight, when crushed to a size of ¼ inch×0. Preferably, the larger size feedstock fuel fraction (4–6 inch×¾ inch) for use in a fluidized bed combustion process, as described herein, is processed in a drum separator or a heavy media bath, and the smaller size feedstock fuel fraction (¾ inch×35 mm.) is processed in accordance with applicant's above-referenced patented process to have an ash content in a range of about 30 percent to about 50 percent, and more preferably in a range of about 35 percent to about 45 percent by weight, based on the dry weight of the fuel produced. The ash content is determined in accordance with ASTM Standards No. 3174 and is based on a particle size of ¼ inch×0.

When crushed culm is used as a feedstock fuel for a fluidized bed combustion process, the crushed culm is initially screened to a size range of 4–6 inch×0 inches, and all the thus sized material is then crushed to a relatively small size range, e.g. about ⅛ inch×0. In accordance with the present invention, the culm is also initially screened to a size range of 4–6 inch×0, and the thus sized material is then washed as described heretofore. The washed material is then further sized to yield a first coal rich fraction in a size range of ¼ inch×0 and a second coal rich fraction in a size range of 4–6 inches×¼ inch. The second fraction is then crushed and mixed with the first fraction to form the feedstock fuel.

When contrasted with unwashed crushed culm fuel, the present invention provides several significant advantages. For instance, unwashed crushed culm should be crushed to a size range of ⅛ inch×0. The fuel of the present invention needs to be crushed only to ¼ inch×0, thereby minimizing fuel crushing equipment and power requirements.

By way of comparison, when using raw culm from a 20 megaton culm bank as feedstock fuel, almost all of the tonnage must be crushed because little is of the desired ⅛ inch×0 size. If the same size culm bank is processed according to the present invention, about 75 percent of the material can be initially separated as non-desirable fuel, and of the remaining 25 percent, about 50 percent is of a ¼ inch×0 size range which does not require crushing. As a result, the remainder which does require crushing amounts to only about 12½ percent of the tonnage of the culm bank or about 2.5 megatons.

There are other advantages. For instance, smaller fuel and ash storage and material handling systems are needed with the fuel of the present invention. The fuel of the present invention requires only 32% of the unwashed crushed culm storage and handling requirements, and the ash produced from burning the fuel of the present invention requires only 17% of unwashed crushed culm storage and handling requirements. The heat loss and dissipation requirements are lower because of the lower relative volumes of ash that are removed and need to be cooled.

The present invention enables higher fluidized bed boiler efficiencies to be realized. For example, the boiler efficiency for unwashed crushed culm is 78.5% as contrasted with a boiler efficiency of 86% with fuel of the present invention. The availability of the fluidized bed boiler island is greater; 80% for unwashed crushed culm and 84% for the fuel of the present invention. There is a reduced potential for boiler erosion, and design risks are minimized. Lower combustion temperatures can be tolerated without loss of efficiency.

In addition to the above advantages, the present invention enables further efficiencies to be realized by enabling a lower percentage of combustion air to be used for ash cooling. The requirements for scavenger materials, such as limestone, are lower, i.e. 32% of that required for unwashed crushed culm fuel. Emissions from the plant are lower, e.g. with unwashed crushed culm fuel the $SO_2$ emissions are 2.1 times higher and the $NO_x$ emissions are 1.8 times higher. The plant water requirements are 20% lower. Moreover, ash disposal is less costly in part because the heat required to be dissipated prior to disposal is approximately 1/7 the heat dissipation requirements for unwashed crushed culm.

The fuel of the present invention provides economic benefits. These include the ability to build a plant with a higher gross rating and lower plant auxiliary loads. The rate of return on investment is higher, and the financing risks are lower because of the use of a proven fuel which is consistent in size and heating value.

In view of foregoing, the advantages and technical benefits of the invention over conventional crush-culm fueled circulating fluidized-bed power plants should now be readily apparent. Thus, in summary, a system is provided which enables the use of high ash particulate fuel separated from washed culm and mine tailings to be efficiently burned and transformed into useful power. It will be understood, of course, that various changes in the details, steps and arrangement of parts, which have been herein described and illustrated in order to explain the nature of the invention, may be made by those skilled in the art within the principle and scope of the invention as expressed in the appended claims.

I claim:

1. A process for producing from a solid carbonaceous refuse a high ash fuel for use in a circulating fluidized-bed combustion chamber, comprising the steps of:
    separating from the refuse a carbonaceous portion having an ash content in a selected range percent by weight;
    separating the carbonaceous portion into first and second fractions, the first fraction being at or above a selected size;
    crushing the first fraction; and
    combining the crushed first fraction with said second fraction.

2. A process according to claim 1 wherein the selected ash content range is between about 30 percent and about 50 percent, by weight.

3. A process according t claim 1 wherein the selected size is above about ¼ inch.

4. A process for reclaiming combustible coal from culm having an ash content in excess of about 60 percent by weight, comprising the steps of: 'screening the culm to extract a culm portion thereof below a first selected size;
    washing the culm portion to extract a carbonaceous portion thereof having a selected ash content;
    screening said carbonaceous portion to produce a first fraction at or above a second selected size, and a second fraction below the second selected size;
    crushing the first fraction; and
    mixing the crushed fraction together with the second fraction.

5. A process according to claim 4 wherein the selected ash content is in a range of about 35 percent to about 45 percent, by weight.

6. A process according to claim 4 wherein the first selected size is 4–6 inches.

7. A process according to claim 6 wherein the second selected size is ¼×0 inch.

8. A process for producing a fuel from culm, comprising the steps of:
    screening the culm to a size range of about 4–6 inch×0;
    washing the screened culm to produce a carbon-rich product having an ash content in a range of about 30 percent to about 50 percent, by weight, and having a size in a range of about 4–6 inch×0;
    screening said carbon-rich product to produce a first fraction having a size range of about 4–6 inch×¼ inch and a second fraction having a size range of about ¼ inch×0;
    crushing the first fraction to a size range of ¼ inch×0; and
    mixing together said first and second fractions to product said fuel.

* * * * *